United States Patent
Gargaro et al.

(10) Patent No.: US 9,275,214 B2
(45) Date of Patent: Mar. 1, 2016

(54) AUTHENTICATION METHOD AND SYSTEM

(75) Inventors: Gianluca Gargaro, Rome (IT); Patrizio Trinchini, Genzano di Roma (IT)

(73) Assignee: International Business Machines Corporation, Armonk, NY (US)

(*) Notice: Subject to any disclaimer, the term of this patent is extended or adjusted under 35 U.S.C. 154(b) by 1838 days.

(21) Appl. No.: 12/245,971

(22) Filed: Oct. 6, 2008

(65) Prior Publication Data
US 2009/0094689 A1 Apr. 9, 2009

(30) Foreign Application Priority Data
Oct. 4, 2007 (EP) .................................. 07117917

(51) Int. Cl.
*G06F 21/36* (2013.01)
(52) U.S. Cl.
CPC ..................... *G06F 21/36* (2013.01)
(58) Field of Classification Search
CPC ....................................................... G06F 21/36
See application file for complete search history.

(56) References Cited

U.S. PATENT DOCUMENTS

| | | | | |
|---|---|---|---|---|
| 5,559,961 A | * | 9/1996 | Blonder | 726/18 |
| 6,862,687 B1 | * | 3/2005 | Suzuki | 726/18 |
| 6,934,860 B1 | * | 8/2005 | Goldstein | 713/183 |
| 2002/0029341 A1 | * | 3/2002 | Juels et al. | 713/184 |
| 2004/0111646 A1 | * | 6/2004 | Little | 713/202 |
| 2004/0123151 A1 | * | 6/2004 | Mizrah | G06F 21/31 726/5 |
| 2004/0243855 A1 | * | 12/2004 | Plagne | 713/202 |
| 2005/0060554 A1 | * | 3/2005 | O'Donoghue | G06F 21/36 713/183 |
| 2006/0031174 A1 | | 2/2006 | Steinmetz | |
| 2007/0016804 A1 | | 1/2007 | Kemshall | |
| 2007/0016941 A1 | | 1/2007 | Gonzalez et al. | |
| 2007/0028299 A1 | | 2/2007 | Albano | |
| 2008/0195976 A1 | * | 8/2008 | Cho | G06F 3/0233 715/840 |
| 2008/0245971 A1 | | 10/2008 | Wimberger-Friedl | |
| 2008/0295165 A1 | * | 11/2008 | Schluderbacher | 726/19 |

FOREIGN PATENT DOCUMENTS

| | | |
|---|---|---|
| EP | 1434408 | 6/2004 |
| GB | 2433147 | 6/2007 |
| WO | 0273377 | 9/2002 |
| WO | WO 0273377 A2 * | 9/2002 |

OTHER PUBLICATIONS

R. Stuhlmuller, "User identity: the key to safe authentication [LAN/WAN security]," Communications News, vol. 37, No. 3, Mar. 2000, 32-8 ISSN: 0010-3632 CODEN: CMUNA9, Nelson Publishing, USA.
"U.S. Appl. No. 12/466,073 Final Office Action", Apr. 26, 2012, 20 pages.
"U.S. Appl. No. 12/466,073 Office Action", Dec. 29, 2011, 18 pages.
"Written Opinion of the ISA for related PCT matter PCT/EP2008/061521", Apr. 10, 2010, 5 pages.

* cited by examiner

*Primary Examiner* — Darren B Schwartz
(74) *Attorney, Agent, or Firm* — DeLizio Law, PLLC

(57) ABSTRACT

A codebook, comprising a number of groups of symbols in a predetermined pattern printed on a card or the like is issued to a user. The user is attributed or selects an extraction pattern representing an order of progression through the symbols in each group of symbols. When the user wishes to make an authentication action an authentication party challenges the user to submit the symbols found at selected positions in the extraction pattern. The user applies the extraction pattern to the codebook and retrieves the symbols found at the selected positions, and submits these to the authenticating party. The authenticating party applies the same extraction pattern to the same codebook, and determines whether the results match those submitted by the user, and in a case where the two sets of symbols match, authenticates the user.

11 Claims, 8 Drawing Sheets

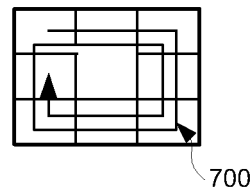
*Figure 7*
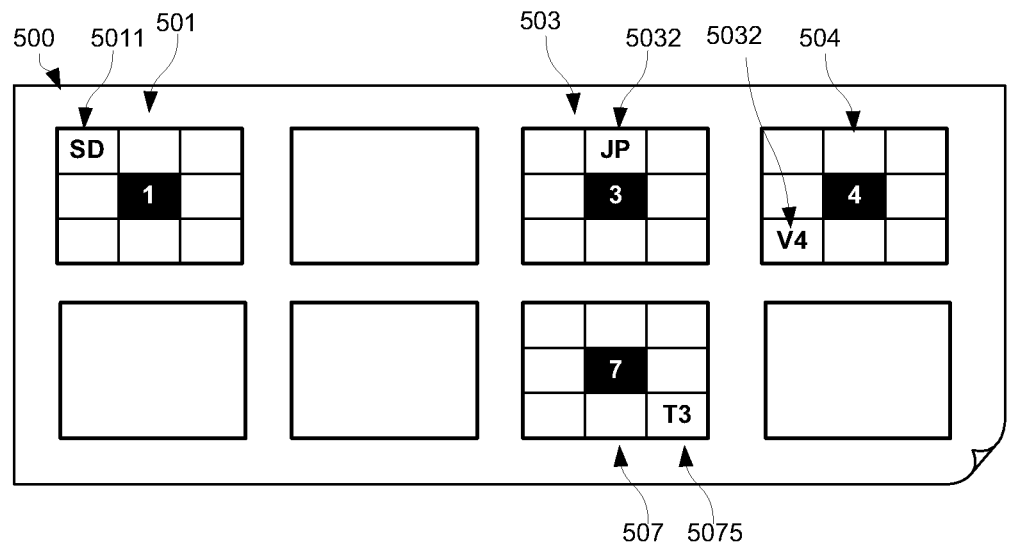
*Figure 8*
*Figure 9*

AUTHENTICATION METHOD AND SYSTEM

CROSS-REFERENCE TO RELATED APPLICATIONS

This application claims priority under 35 U.S.C. §119 to European patent application EP 07117917.0, filed Oct. 4, 2008, the disclosure of which is incorporated herein by reference.

BACKGROUND OF THE INVENTION

The present invention relates to an authentication method and system, and more particularly to a two factor authentication system based on the generation of a low cost code book. The number of interactions that an individual may carry out via an electronic interface is continually increasing. Automatic Teller Machines are now ubiquitous, and with the spread of the Internet, services such as online commerce, Internet banking, credit card and other bill payments, personalized websites including webmail sites, and even tax declaration are increasingly common. In virtually all cases it is necessary for a user to identify himself to the system at some stage, and furthermore to authenticate this identity. The usual means for carrying out this authentication is by submitting a PIN code, password or other piece of secret data, which is known by the service and the user alone. With the multiplication of such services, an individual is required to maintain and remember an increasingly large number of such pieces of secret information. Furthermore, as a general rule it is desirable that each such piece of information should be unique to the service in question, and that it should be as large and random as possible, to minimize the risk of the discovery of one secret prejudicing the security of multiple systems, and the probability of a third-party guessing the secret. Ideally each piece of secret information should be replaced frequently to maintain high security standards. It is also highly undesirable that a user should write down or otherwise record such secrets in an unprotected manner. A tension thus arises between the need for a user to remember a large number of large pieces of random data, and the propensity of most individuals to choose the simplest option, such as choosing a well known and easy to remember set of passwords and using them in a cyclic way for all their services. This behaviour enormously reduces the security of protected resources.

SUMMARY OF THE INVENTION

According to the present invention, a codebook, comprising a number of groups of symbols in a predetermined pattern, is issued to a user. The user is attributed or selects an extraction pattern representing an order of progression through the symbols in each group of symbols. When the user wishes to make an authentication action an authentication party which also has knowledge of the content of the codebook and the extraction pattern challenges the user to submit the symbols found at selected positions in the extraction pattern. The user applies the extraction pattern to the codebook and retrieves the symbols found at the selected positions, and submits these to the authenticating party. The authenticating party applies the same extraction pattern to the same codebook, and determines whether the results match those submitted by the user, and in a case where the two sets of symbols match, authenticates the user.

The method of the present invention may also be employed using an authenticating computer system and a codebook. The computer system can receive requests for authentication across a network, poll the requesting parties for data strings based upon extraction of information from requested reference sequences and extraction patterns from the codebook, and, if a comparison of the information received from the requesting party matches the expected result, the requesting party may be authenticated to access a program on the authenticating computer system or to access another computer across the network.

BRIEF DESCRIPTION OF THE DRAWINGS

FIG. 7 illustrates an exemplary extraction pattern of the present invention;

FIG. 8 further illustrates use of an extraction pattern with the present invention;

FIG. 9 shows the physical support of FIG. 6, with the symbols in the positions not requested obscured for the sake of clarity;

DETAILED DESCRIPTION

Figure 1:
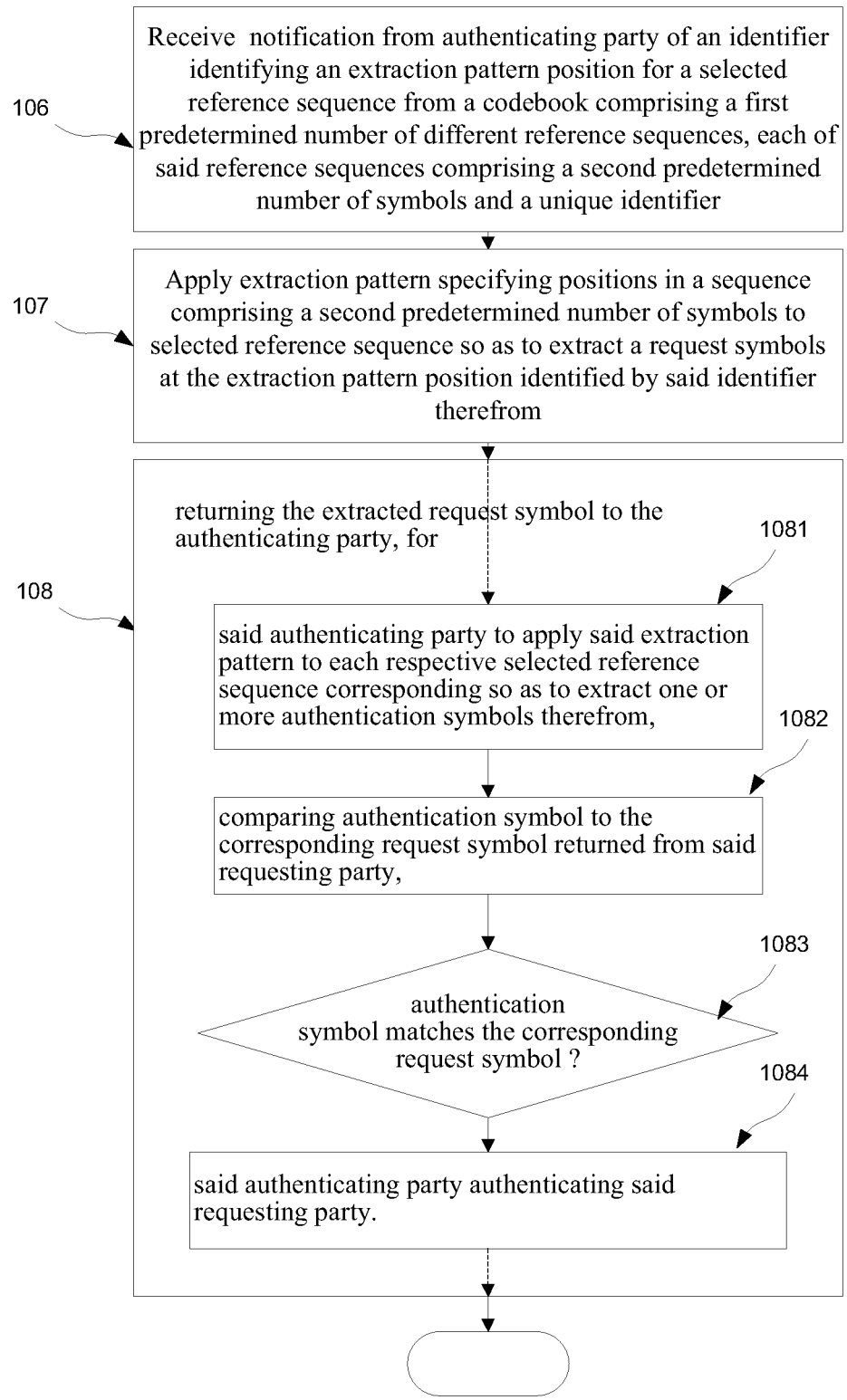
FIG. 1 is a flow diagram view of a first embodiment of the present invention.

Referring now to FIG. 1, a flow chart of a first embodiment of the invention is shown and will be described. A user seeking authentication to access a secure network or other electronic service initiates authentication by using a device, such as a mobile telephone, PDA, personal computer, automated teller machine terminal, to poll an authenticating party. This may be done by the use of a conventional login, by entering a user name, or otherwise providing user information to the network in a convention low-security manner. The user then receives notification from the authenticating party identifying an extraction pattern position for a selected reference sequence from a codebook comprising a first predetermined number of different reference sequences, each of said reference sequences comprising a second predetermined number of symbols and a unique identifier 106. Next, in response to said notification, the user references the code book to apply the extraction pattern to specific positions in sequence to extract a second predetermined number of symbols to said selected reference sequence so as to extract requested symbols at the extraction pattern position identified by said identifier 107. The user then returns the extracted symbol or symbols are to the authenticating party 108. The extracted request symbol or symbols are returned so that the authenticating party may apply the extraction pattern to each respective selected reference sequence to a matching local copy of the codebook so as to extract one or more authentication symbols 1081, and the authentication symbols received by the authenticating party from the user are then compared to the corresponding request symbols 1082. If, in each respective authentication symbol matches the corresponding request symbol 1083, the authenticating party authenticates the user 1084.

Figure 2:
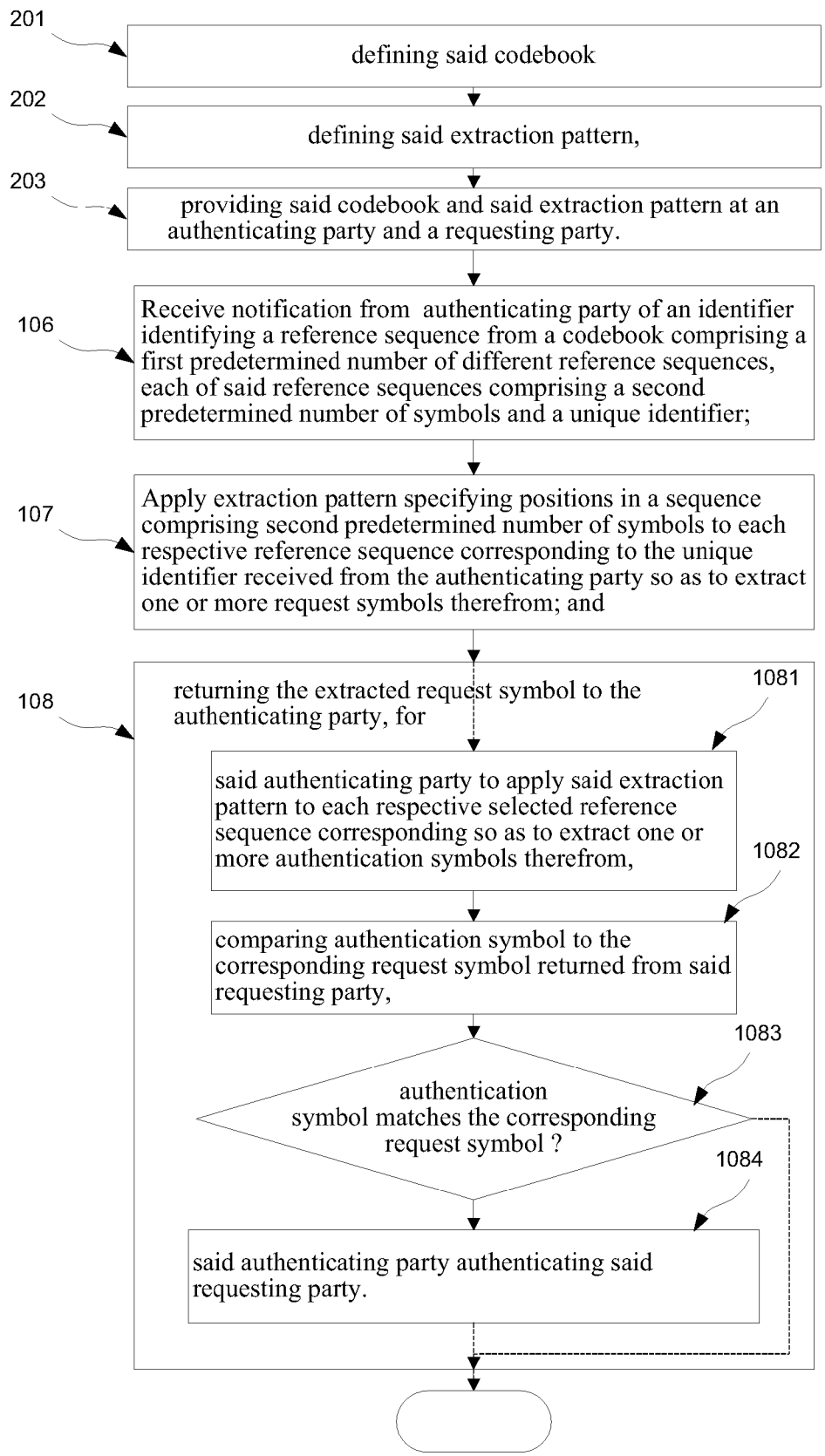
FIG. 2 is a flow diagram view of a second embodiment of the present invention.

Referring now to FIG. 2, a flow chart for an alternative embodiment of the invention is shown and will be described. More particularly, in addition to steps 106 to 108 as described in FIG. 1 and again incorporated within this embodiment, FIG. 2 further illustrates a prior step of defining a codebook 201, and further defining extraction patterns 202 by referencing the codebook. Unlike other secure methods that require a time chip, a USB key or another electronic device, a codebook may consist of printed matter, such as a reference card. The codebook and the extraction pattern are provided to both an authenticating party and a requesting party 203. The extraction pattern and the codebook may be defined at the user device, or at the authenticating party, or by collaboration between these two parties, or either or both may still further be provided by one or more third parties. Both the authenticating party and the user device must share knowledge of the extraction pattern and the codebook. The codebook may be randomly or pseudorandomly generated. The extraction pattern may be selected by the user for example from a standard set of possible patterns. The extraction pattern may alternatively be any arbitrary pattern as selected by the authenticating party or the user or randomly or pseudorandomly determined. An underlying assumption of the present authenticating method is that the codebook and the extraction pattern are known only to the two parties, and to no other party. Knowledge of either the codebook or the extraction pattern alone by a third party does not prejudice the security of the method however. It is therefore desirable to provide the codebook and the extraction pattern to the parties 203 via a secure method. The data may be sent as an encrypted electronic signal, or may be sent by some alternative parallel channel such as by conventional mail, facsimile message, telephone message, or other communication methods known in the art.

Figure 3:
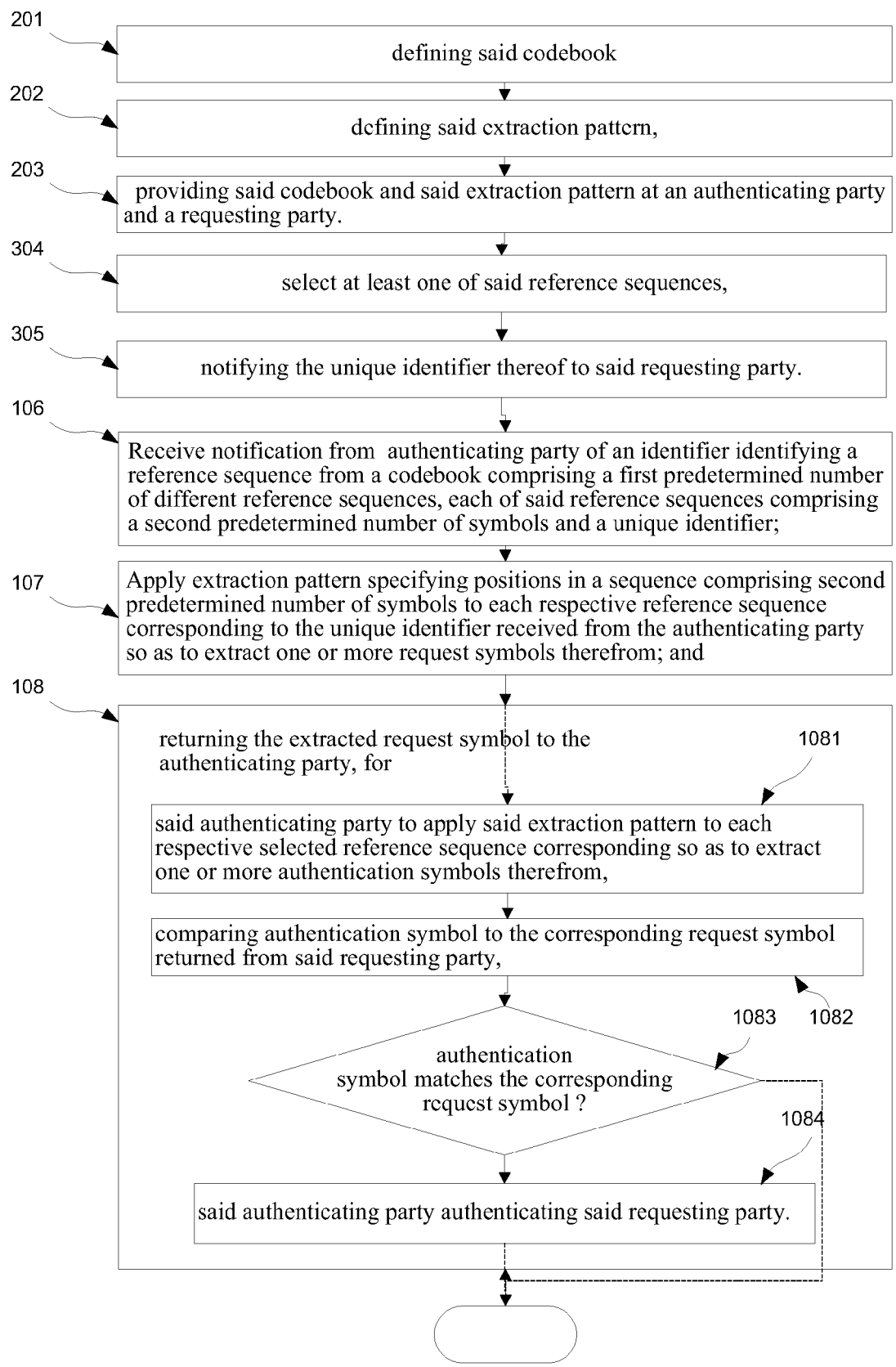
FIG. 3 is a flow diagram view of a third embodiment of the present invention.

Referring now to FIG. 3, a flow chart for a second alternative embodiment of the invention is shown and will be described. This embodiment incorporates the steps of the prior two embodiments described above, but includes additional intermediate steps. Namely, after the codebook 201 and extraction pattern 202 are defined and the codebook is provided to the authenticating and requesting parties 203, the method of FIG. 3 comprises the further steps of the authenticating party selecting at least one of the plurality of reference sequences 304, and then notifying the unique identifier thereof to the requesting party 305. Thus from a codebook containing a plurality of reference sequences, a subset of the available reference sequences may be selected for any given authentication. The selected reference sequences may be chosen in a manner which is random, pseudorandom or otherwise unpredictable to external parties. The reference sequences for use in authentication may be preselected by the user or the authenticating party either for a particular authentication situation, or for all authentications. The reference sequences may be redefined as necessary. The steps of receiving notification 106, applying the extraction pattern 107, returning the extracted symbol 108 and verifying 1083, along with all other steps, as initially described in the discussion of FIG. 1, remain the same throughout all embodiments of the invention.

Reviewing FIG. 3 and the previous figures, the method of the present invention consists of the steps of defining a codebook 201 comprising a first predetermined number of different reference sequences, each of said reference sequences comprising a second predetermined number of symbols and a unique identifier. An extraction pattern 202 is identified, and the codebook is providing the codebook to a requesting party 203. It is noted that the extraction pattern may be identified by the authenticating party, selected by the requesting party or otherwise created by collaboration between the authenticating party and the requesting party. It is further noted that the codebook may be provided 203 in physical or electronic form, and, if provided in electronic form, may be printed by the requesting party or stored in a memory for later retrieval and on-screen viewing on a computer, PDA, cell phone, or another electronic device including a screen as known in the art. Next, the authenticating party waits to receive a request from a requesting party for authentication to start the authentication sequence. The authenticating party responds to the authentication request by specifying at least one selected reference sequence 304 and notifying the requesting party of the unique identifier of the reference sequence 305. It is noted that the reference sequence may be preselected prior to receiving a request from the requesting party and queued awaiting a request, or selected when a request is received. The requesting party receives the information identifying the reference sequence, and then acts upon the received information of the reference sequence 106 and unique identifier by applying the extraction pattern 107, and returning the code extracted 108. This reception and return of information can be done across a network using any network device, such as a computer, a telephone, a PDA or other electronic communications device, or the present invention could also be employed on a single computer. The authenticating party then compares the sequence of data returned from said requesting party based on the extracted symbols determined from said reference sequence using the extraction pattern position with an expected sequence based upon the previously determined reference sequence in the codebook 1082, then, if the comparison of returned data matches the expected sequence 1083, authenticates the requesting party 1084. The authenticating party may be a remote authenticator, allowing the requesting party to access another site or program on the network, or may reside on the same computer as the program to which the requesting party seeks authentication.

Figure 4:
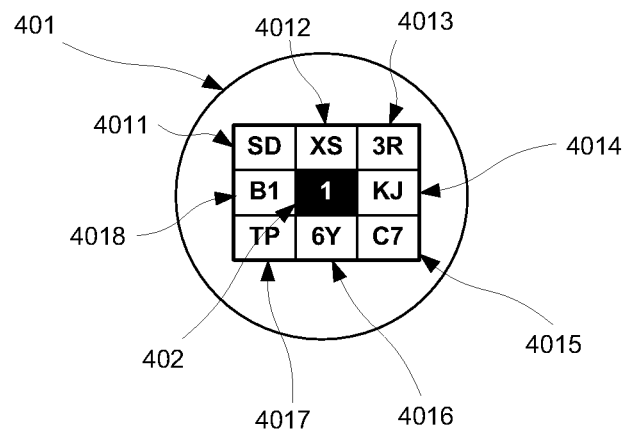
FIG. 4 is a view of an exemplary configuration of a reference sequence.

Turning now to FIG. 4, an exemplary configuration of a reference sequence is illustrated. In the current embodiment of the invention, the codebook is embodied as physical printed matter. This physical support may be, for example, a piece of sheet material, such as paper, card, plastic or similar material, upon which are printed the first plurality of reference sequences, each comprising the second plurality of symbols and a respective unique identifier. It will be understood that the unique identifier need not be explicitly provided, but may be implicitly provided in the form of the position of the reference sequence on the physical support, e.g. by means of the identifier "top left" and so on. One obvious special case is the situation where only one reference sequence is provided, where the identifier is simply, "the only reference sequence provided". Other unique identifiers my take the form of the colour, shape or configuration of the reference sequence. As shown by the token illustrated, the reference sequence comprises a rectangle 401 containing nine identical smaller rectangles in a 3 by 3 matrix. The central one of these nine smaller rectangles 402 contains a symbol service as a unique identifier for the reference sequence in question. As shown here, the unique identifier is a number 1. The remaining eight smaller rectangles 4011, 4012, 4013, 4014, 4015, 4016, 4017 and 4018 are arranged around the central rectangle 402. Each of these peripheral rectangles contains an authentication symbol, which as shown consist in each case of a pair of alphanumeric characters. Naturally, any symbol or user identifiable characteristic may be used as an authentication symbol, for example, characters of any alphabet, pictograms or images, colours, patterns and so on. The limiting considerations are simply that the user must be able to distinguish one from another, and submit the same to the authenticating party. In some cases this may call for the use of an existing interface wherein alphanumeric or even purely numeric input is necessary.

Figure 5:
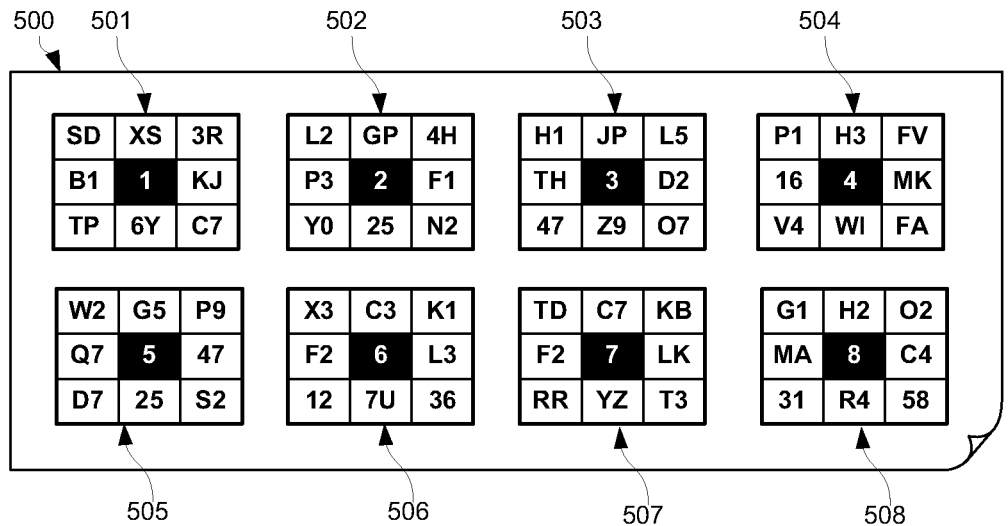
FIG. 5 is an illustration of a codebook on a physical support according to an embodiment.

FIG. 5 shows a codebook on a physical support according to an embodiment. As shown in FIG. 5 there is provided a physical support 500 bearing eight reference sequences 501, 502, 503, 504, 505, 506, 507 and 508, having the unique identifiers 1, 2, 3, 4, 5, 6 and 7 respectively. These eight reference sequences are each laid out is the same manner as that described with respect to FIG. 4. It will be noted that the authentication symbols provided in each reference sequence are different from one sequence to the next, and that there is no discernable pattern in the authentication symbols.

Figure 6:
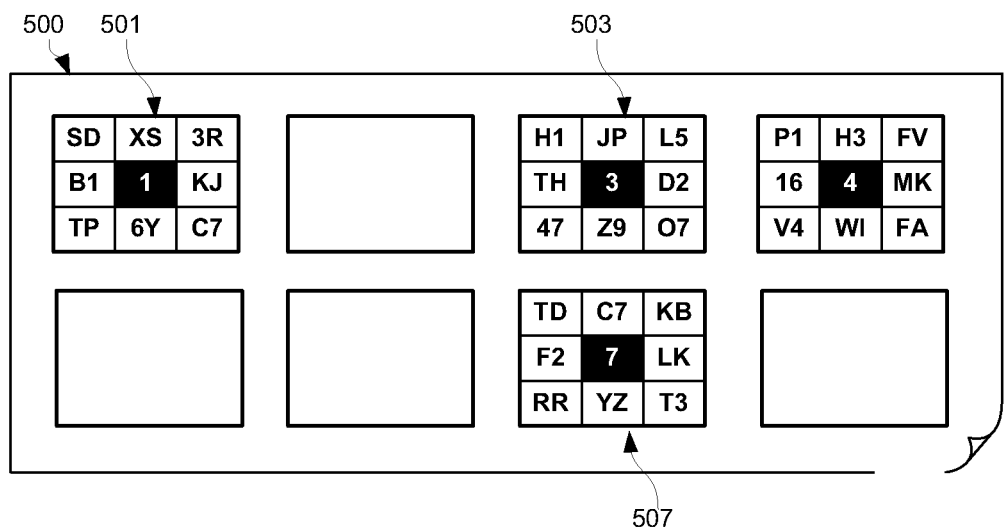
FIG. 6 displays the application of the extraction of the present invention to a physical support of FIG. 5.

FIG. 6 shows the application of the third embodiment to the physical support of FIG. 5. In accordance with the third embodiment of the invention as described above, at step 305 one or more reference sequences are selected from the available plurality, and the selected reference sequences are notified to the user by means of the unique identifier of each selected reference sequence. In this example, the first, third, fourth and seventh reference sequences were selected for a particular authentication operation. Subsequently, the authenticating party notifies the user with the unique identifiers "1", "3", "4" and "7", on the basis of the physical support shown in FIG. 5. The user may then disregard the reference symbols 502, 505, 506 and 508. Accordingly, as shown in FIG. 6, only the remaining reference sequences 501, 503, 504 and 507 are retained. In some embodiments, this obscuring of the reference sequences not required for a particular authentication is only notional. In other embodiments, some or all reference sequences may be obscured by, for example, a foil or other removable layer, with only the sequences requested by the authenticating party being laid bare.

Turning now to FIG. 7, an exemplary extraction pattern is shown. As described above, it is necessary to apply an extraction pattern to the selected reference sequence or sequences. FIG. 7 shows a reference sequence as a 3 by 3 matrix, although the authentication symbols are omitted for the same of clarity. An arrow 700 indicating a path through the eight peripheral smaller rectangles describes a spiraling path starting at the top left outer rectangle and proceeding clockwise about the center. This spiral represents the sequence in which one would count through the various symbols in order to arrive at a particular selected extraction pattern position. For example, if the third extraction pattern position was requested, the symbol retrieved would be that located in the top right hand rectangle. If the eighth extraction pattern position was requested, the symbol retrieved would be that located in the left hand column on the second row, and so on.

FIG. 8 shows the extension of the extraction pattern previously described extended to larger numbers. The extraction pattern position number may be greater than the number of symbols present. In such cases, the extraction pattern may be applied in a repetitive manner until the position number is attained. As previously described with respect to FIG. 7, extraction pattern positions 1 to 8 are arrived at by a simple application of the extraction pattern to the matrix, as shown in the leftmost matrix 801. When a ninth extraction pattern position is called for, the pattern simply starts again at the first position, and so on as shown in the central matrix 802, similar to a modulo operation.

As described, the present invention implements a two-factor authentication mechanism, because it is based on something the user owns, namely the codebook, and something the user knows (the extraction pattern to decode authentication questions using the card). One skilled in the art will appreciate that a very wide range of extraction patterns may be envisioned. Even in the case of the simple matrix described in the forgoing embodiments a very large number of permutations are possible, including spirals or circles in either direction, zig-zags along horizontal or vertical lines, letters of the alphabet or other characters and myriads of other patterns. Different extraction patterns may be applied for different reference sequences. The number of positions defined in an extraction pattern before it starts repeating itself may not be equal to the number of positions in the reference sequence, so that each iteration starts from a different point. Still further, rather than simply repeating the pattern as previously described for position numbers greater than positions given, a different series of steps may be described for subsequent iterations. For example, while for positions 1 to 8 a clockwise circulation though the various positions is described, for positions 9 to 17 a reverse in direction may be called for as shown in element 803. Again, any number of variations may conceived. The number of positions prior to a change in pattern need not be an integral multiple of the number of positions. The pattern may be entirely arbitrary, although, for ease of the use, it is preferable that the pattern should correspond to some easily memorable pattern such as a sequence of spirals or circles in either direction, zig-zags along horizontal or vertical lines, letters of the alphabet or other characters. With a simple reference sequence selection of 6 digits and a {8,8,2} codebook, that is, a codebook with 8 reference sequences, 8 authentication symbols per reference sequence and 2 characters per authentication symbol, it is possible to generate to $8^6=262,144$ different authentication questions and provide as many answers composed by 6*2=12 symbols.

Turning now to FIG. 9, one can appreciate that by applying the given extraction pattern to selected reference sequences as described with respect to FIG. 6, it is possible to extract a series of authentication symbols. Continuing the prior examples, and using a clockwise extraction pattern starting at the upper left corner illustrated in FIG. 7, suppose that reference sequences 1, 3, 4 and 7 and the positions 1, 2, 7 and 5 have been requested. FIG. 9 shows the physical support of FIG. 6, with the symbols in the positions not requested obscured for the sake of clarity. Thus as shown by applying the sequence of FIG. 7 to the reference sequence numbered 1, and selecting the first position in the pattern, we select the symbol "SD" in the top left rectangle of the top left reference sequence. Next as shown by applying the sequence of FIG. 7 to the reference sequence numbered 4, and selecting the second position in the pattern, we select the symbol "JP" in the top centre rectangle of the third reference sequence in the top row. Next as shown by applying the sequence of FIG. 7 to the reference sequence numbered 4, and selecting the seventh position in the pattern, we select the symbol "V4" in the bottom left rectangle of the rightmost reference sequence in the top row. Finally as shown by applying the sequence of FIG. 7 to the reference sequence numbered 7, and selecting the fifth position in the pattern, we select the symbol "T3" in the bottom right rectangle of the third reference sequence in the top row. When thus applying the selection process at the user site, the extracted symbols "SD,JP,V4,T3" can then be transmitted to the authenticating party. By applying the same process at the authenticating party, the same symbols can be derived, and compared to those received for the user, and in a case where the two sets of symbols are found to match, the authenticating party can authenticate the user, as described above. Positions 1, 2, 7 and 5 are derived from the secret key the user knows and that has been communicated to the authentication service at the time of card activation. User applies his key code according to a known (to the user and to the authentication system) mapping strategy. The key code is applied always in the same way, regardless of the reference sequences asked by the authentication system. For instance, if the key code is exactly 1275 and the mapping strategy is the clockwise spiral represented in FIG. 7, when the system asks for reference sequences 2, 3, 5, 8 from the card represented in FIG. 5, the extracted symbols will be: L2-L5-D7-58; again, if the system asks for reference sequence 2, 4, 6, 7, the extracted symbols, using the same key code and mapping strategy, will be: L2-P1-12-T3.

In the present invention, the authenticating party may optionally be a central authentication service which provides authentication for a number of different services. The central authentication may define and distribute codebooks, and issue notifications. All communications may pass through service providers making use of this centralised authentication system. Such a centralized authentication service may act as a hub of user profile data; this allows service providers to just define which information is relevant for them, and it can be extracted from existing profiles, thereby minimizing data entry from the end user of multiple services. Service providers may also agree with the authenticating party about quality and strength of authentication (SLA), such as the minimum length of authentication answers, size and lifetime of codebooks, entropy of authentication answers, and other security parameters. Centralization of user profile data is also valuable for end users since they can immediately know the services to which they are subscribed, and may easily update profile information to all subscribed services or revoke or suspend one or all user subscriptions with just one click. The authenticating party may generate authentication questions with a limited lifetime, which are equivalent to one time passwords. In such cases if the delay between step 1-6 and step 1081 exceeds a predetermined delay, authentication may be automatically refused, and the process may optionally return to step 106, with new reference sequences and extraction pattern positions being requested.

Figure 10:
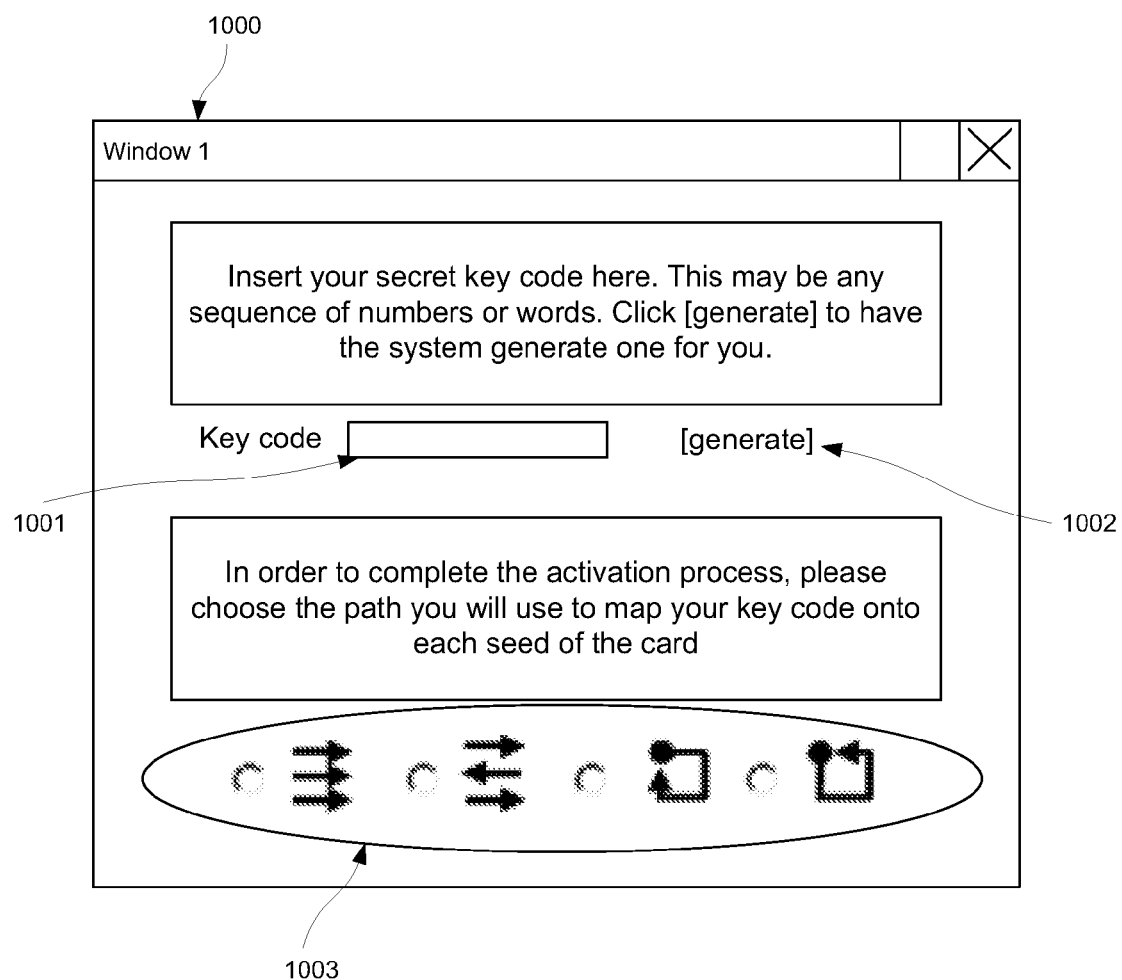
FIG. 10 is a screenshot of an interface for the activation step of the present invention.

Turning now to FIG. 10, an optional implementation of the present invention is illustrated and will be described. Initially, a user seeks access to a particular service provider, which may optionally forward the user to the authenticating party. The user is then able to register with the authenticating party providing basic profile information, and choosing a username and a temporary password. The authenticating party generates a codebook according to the SLA with the service provider and binds it to the service of the provider as requested by the user. A codebook is delivered to the user, using a method known in the art such as sending a download link to the user e-mail address for downloading and printing, or delivering a codebook via a physical courier. After receiving the codebook, the user must activate it, communicating to the authenticating party the preselected reference sequences and the extraction pattern he will use. The preselected reference sequences and/or the extraction pattern can be changed at any time during the codebook lifetime. For example, a conventional computer graphical user interface window such as a web browser 1000, comprising a text box 1001 for the entry of the selected reference sequences, a button or similar interface feature 1002 to initiate the automatic selection of reference sequences and a set of "radio buttons" or the like associated with a set of predefined extraction patterns from which a user may select. Changing the extraction pattern is the easiest way to modify the authentication answer to a same authentication question; a user will always remember the same reference sequences and will just apply a different mapping strategy of the code on his/her card, thereby reading the card in a different manner. An authenticating party can use the same authentication mechanism offered to service providers; after a user activates a codebook, he can choose to use it also to logon to the authenticating party; no additional password is required: the user will just remember the reference sequences and own the appropriate extraction pattern. Given the extremely low cost and ease of generation of the physical support for the codebook, users may own multiple codebooks, one for each type of services; generally, this is not possible with other two-factor authentication systems currently known in the art, because almost all of them rely on hardware devices, which are much more expensive than a physical support such as a printed card as previously described.

Figure 11:
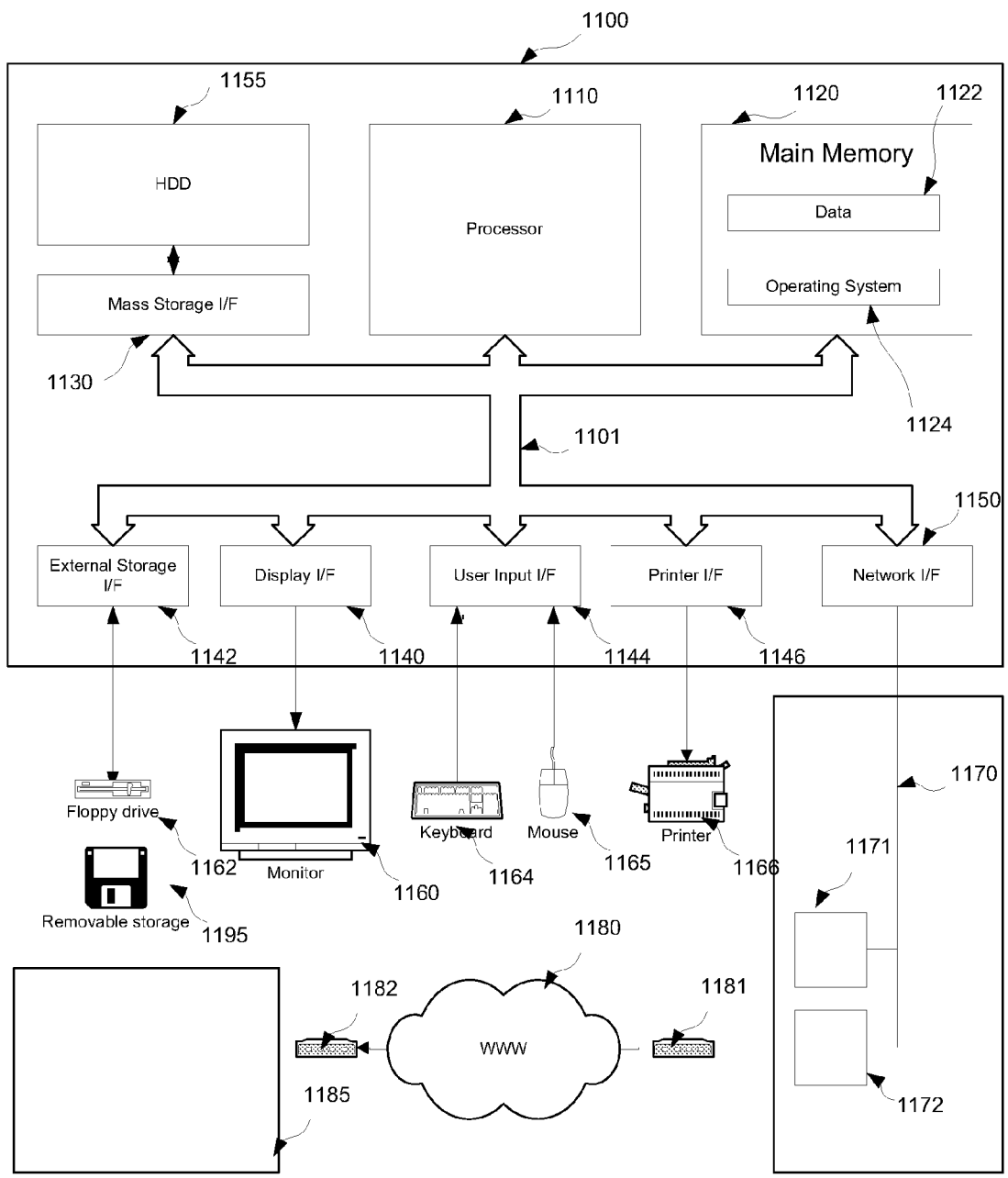
FIG. 11 is a block diagram of a computer system suitable for implementing the present invention.

FIG. 11 depicts a computer system suitable for implementing the present invention. Computer system 1100 may correspond to the user device described above and comprises a processor 1110, a main memory 1120, a mass storage interface 1130, a display interface 1140, and a network interface 1150. These system components are interconnected through the use of a system bus 1101. Mass storage interface 1130 is used to connect mass storage devices (Hard disk drive 1155) to computer system 1100. One specific type of removable storage interface drive 1162 is a floppy disk drive which may store data to and read data from a floppy disk 1195, but other types of computer readable storage medium may be employed, such as readable and optionally writable CD-ROM drive. There is similarly provided a user input interface 1144 which received user interactions from interface devices such as a mouse 1165 and a keyboard 1164. There is still further provided a printer interface 1146 which may send and optionally receive signals to and from a printer 1166. Main memory 1120 in accordance with the preferred embodiments contains data 1122, an operating system 1124. Computer system 1100 utilizes well known virtual addressing mechanisms that allow the programs of computer system 1100 to behave as if they only have access to a large, single storage entity instead of access to multiple, smaller storage entities such as main memory 1120 and HDD 1155. Therefore, while data 1122, operating system 1124, are shown to reside in main memory 1120, those skilled in the art will recognize that these items are not necessarily all completely contained in main memory 1120 at the same time. It should also be noted that the term "memory" is used herein to generically refer to the entire virtual memory of computer system 1100. Data 1122 represents any data that serves as input to or output from any program in computer system 1100. Operating system 1124 is a multitasking computer operating system; those skilled in the art will appreciate that the spirit and scope of the present invention is not limited to any one operating system. Processor 1110 may be constructed from one or more microprocessors and/or integrated circuits. Processor 1110 executes program instructions stored in main memory 1120. Main memory 1120 stores programs and data that processor 1110 may access. When computer system 1100 starts up, processor 1110 initially executes the program instructions that make up operating system 1124. Operating system 1124 is a sophisticated program that manages the resources of computer system 1100. Some of these resources are processor 1110, main memory 1120, mass storage interface 1130, display interface 1140, network interface 1150, and system bus 1101. Although computer system 1100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 1110. However, those skilled in the art will appreciate that the present invention applies equally to computer systems that simply use I/O adapters to perform similar functions. Display interface 1140 is used to directly connect one or more displays 1160 to computer system 1100. These displays 1160, which may be non-intelligent (i.e., dumb) terminals or fully programmable workstations, are used to allow system administrators and users to communicate with computer system 1100. Note, however, that while display interface 1140 is provided to support communication with one or more displays 1160, computer system 1100 does not necessarily require a display 1165, because all needed interaction with users and other processes may occur via network interface 1150. Network interface 1150 is used to connect other computer systems and/or workstations (e.g., 1175 in FIG. 11) to computer system 1100 across a network 1170. The present invention applies equally no matter how computer system 1100 may be connected to other computer systems and/or workstations, regardless of whether the network connection 1170 is made using present-day analogue and/or digital techniques or via some networking mechanism of the future. In addition, many different network protocols can be used to implement a network. These protocols are specialized computer programs that allow computers to communicate across network 1170. TCP/IP (Transmission Control Protocol/Internet Protocol) is an example of a suitable network protocol, for example over an Ethernet network. As shown, the network 1170 connects the system 1100 to two further devices 1171 and 1172, which may be other computer systems similar to that described above, or other network capable devices such as printers, routers etc. In the present example, network device 1172 is a local server, which is connected via a modem 1181 to a public network 1180 such as the World Wide Web. By means of this public network 1180 a connection to a remote device or system 1185 may be established. The role of the authenticating party as described above may be implemented by a local network computer 1170, a local server 1172 or a remote system or device 1185, depending on the implementation of the invention selected.

It is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD ROM 1195, and transmission type media such as digital and analogue communications links. The invention can take the form of an entirely hardware embodiment, with recourse to suitably specified FPGAs, ASICs, CPLDs, dedicated integrated circuits and circuits formed of discrete components or any combination of all of these, an entirely software embodiment e.g. in the form of software running on conventional hardware as described above with regard to FIG. 11, or an embodiment containing both hardware and software elements. In a preferred embodiment, the invention is implemented in software, which includes but is not limited to firmware, resident software, microcode and other forms of implementation known in the art. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to communicate with other data processing systems or remote printers or storage devices through intervening private or public networks. Modems, cable modem and Ethernet cards are just a few of the currently available types of network adapters.

The invention claimed is:

1. A method of authentication for access to an electronic service comprising the steps of:
    receiving, by a user device via a secure electronic communications interface, a notification from an authenticating computing device, the notification identifying an order subset of reference sequences of a codebook comprising a plurality of different reference sequences, each of said reference sequences comprising a plurality of symbols and each of said reference sequences having a unique identifier, wherein the notification includes a reference sequence in the subset using the unique identifier;
    applying an extraction pattern defining a sequence of positions of symbols in each of the ordered subset of reference sequences and a key code specifying positions in the ordered subset of reference sequences to extract request symbols from the ordered subset of reference sequences, wherein a position of a request symbol is determined according to the key code, the extraction pattern and an order of the reference sequence in the ordered subset of reference sequences; and
    returning, by the user device via the secure electronic communications interface, the extracted request symbols to the authenticating computing device;
    applying, by the authenticating computing device, said extraction pattern to said subset of reference sequences so as to extract authentication symbols therefrom, and comparing the authentication symbols to the corresponding request symbols returned from a requesting party via the user device, and in response to said authentication symbols matching said request symbols, said authenticating computing device authenticating said requesting party.

2. The method of claim 1 further comprising:
defining said codebook;
assigning said extraction pattern; and
providing via the secure communications electronic communications interface said codebook and said extraction pattern to the authenticating computing device and the requesting party.

3. The method of claim 1 further comprising:
receiving, by said authenticating computing device, a selection of the extraction pattern from a plurality of potential extraction patterns.

4. The method of claim 1 wherein said codebook further comprises physical media.

5. A method of authentication for access to an electronic service comprising the steps of:
defining a codebook comprising a plurality of different reference sequences, each of said reference sequences comprising a plurality of symbols and having a unique identifier;
providing via a secure electronic communications interface said codebook to a requesting party;
assigning an extraction pattern defining a sequence of positions of symbols for the reference sequences;
receiving via the secure electronic communications interface a request from the requesting party for authentication;
in response to the request, communicating to a user device of the requesting party an indication of an order subset of the reference sequence using the unique identifier of each reference sequence in the ordered subset;
receiving a sequence of data via the secure electronic communications interface from the user device, the sequence of data based on extracted symbols determined from said ordered subset of the reference sequences, a key code specifying an ordered set of positions, and said predetermined extraction pattern;
comparing the sequence of data with an expected sequence based upon said codebook, said reference sequence, said extraction pattern and said key code;
authenticating said requesting party if said comparison of returned data matches said expected sequence.

6. The method of claim 5 wherein said codebook further comprises physical media possessed by said requesting party.

7. The method of claim 5 wherein said codebook is further stored in a memory.

8. The method of claim 5 wherein said extraction pattern is based upon input received via the secure electronic communications interface from said requesting party.

9. A system comprising:
an authenticating computer system comprising a processor, a memory and a network communication interface;
a codebook comprising a plurality of reference sequences;
a computer program stored in said memory to receive, from a user device, an authentication request via said network communication interface, said program responding to said authentication request by transmitting via the network communication interface an ordered subset of the plurality of reference sequences to the user device, receiving from the user device a response based on said specified ordered subset of the plurality of reference sequences, an extraction pattern and a key code specifying positions for the ordered subset of the plurality of reference sequence, comparing said response with an expected result, and conveying, to the user device, an authentication signal when said response matches said expected result.

10. The system of claim 9 wherein said authentication signal is further conveyed across said network communication interface to the user device.

11. The system of claim 9 wherein said authentication signal is further conveyed to a second computer program executing on the user device to authorize use of said second computer program.

* * * * *